Feb. 13, 1951         H. W. HOFFMAN ET AL         2,541,515
AUTOMATIC CLUTCH OPERATING MECHANISM
Filed Oct. 9, 1946                              7 Sheets-Sheet 1

INVENTORS
HARRY W. HOFFMAN
STANLEY M. CUMMINGS
By Paul, Paul & Moore
ATTORNEYS

Feb. 13, 1951 H. W. HOFFMAN ET AL 2,541,515
AUTOMATIC CLUTCH OPERATING MECHANISM
Filed Oct. 9, 1946 7 Sheets-Sheet 3

INVENTORS
HARRY W. HOFFMAN
STANLEY M. CUMMINGS
By Paul, Paul H Moor
ATTORNEYS

Feb. 13, 1951     H. W. HOFFMAN ET AL     2,541,515
AUTOMATIC CLUTCH OPERATING MECHANISM
Filed Oct. 9, 1946     7 Sheets-Sheet 5
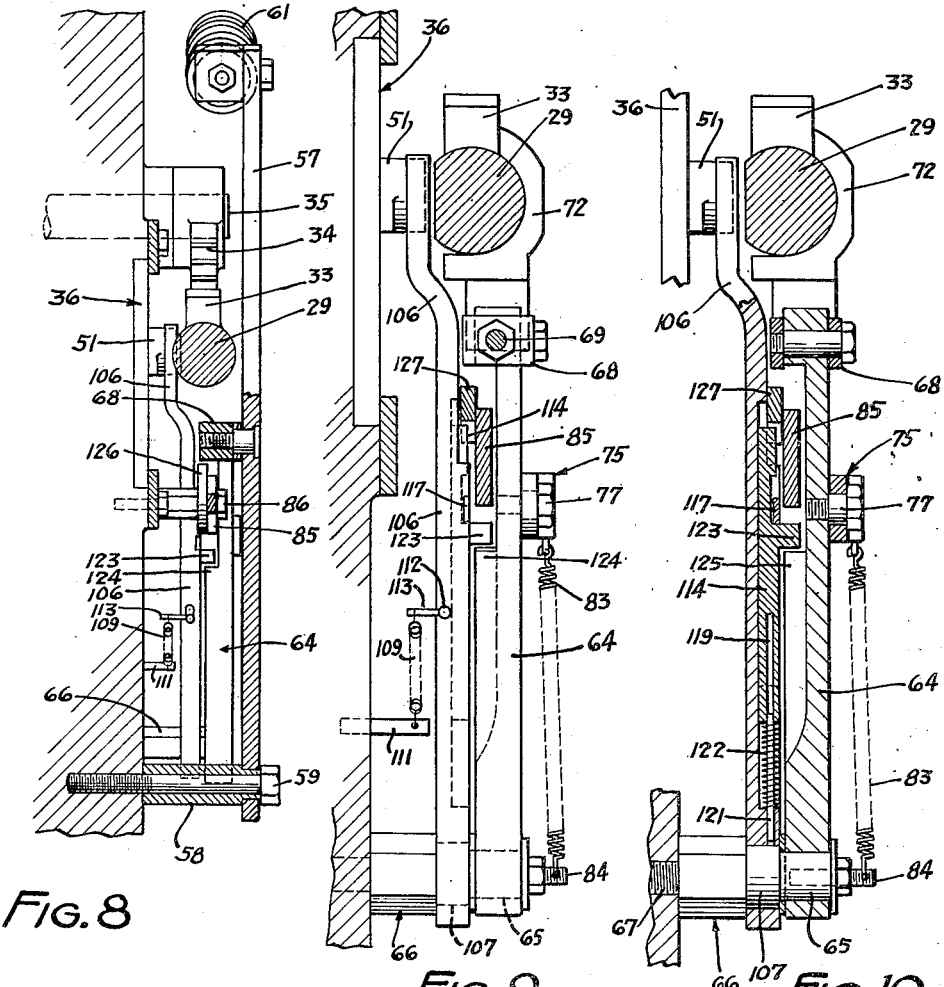
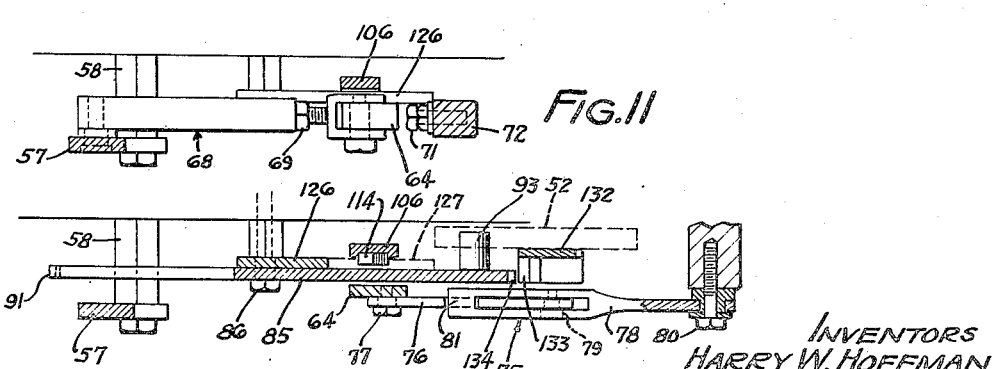
INVENTORS
HARRY W. HOFFMAN
STANLEY M. CUMMINGS
By Paul, Paul & Moore
ATTORNEYS

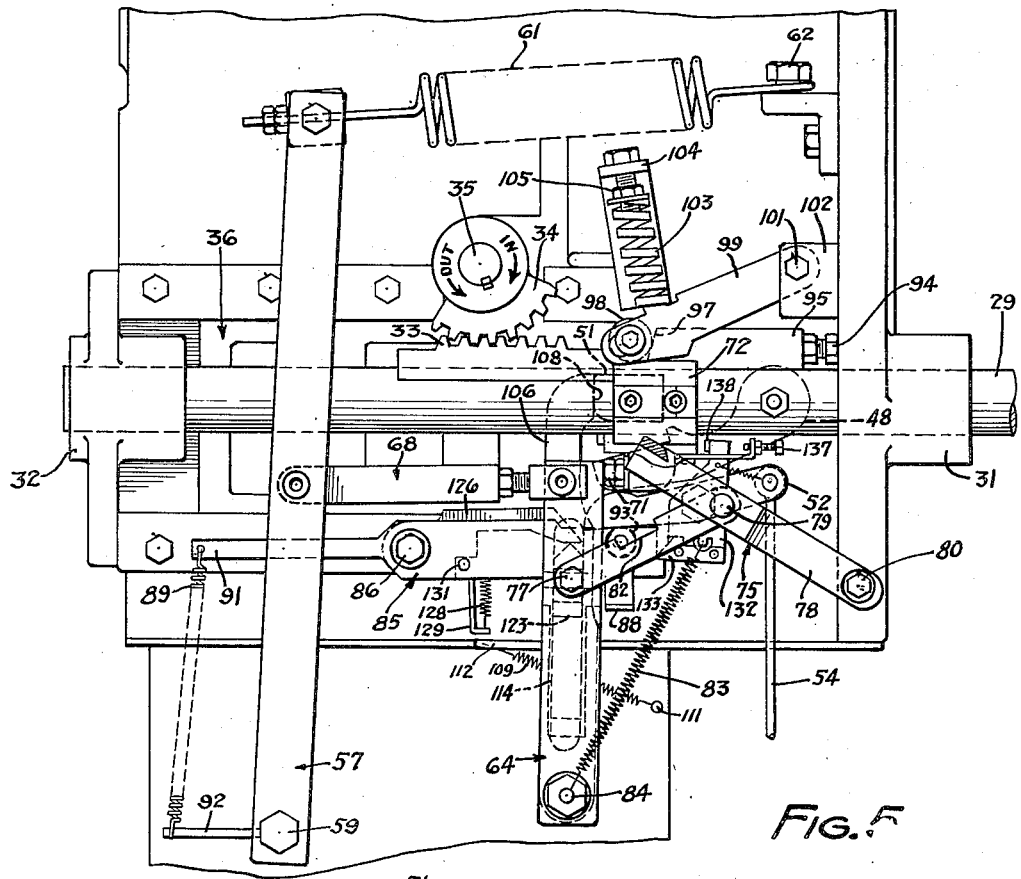
Fig. F
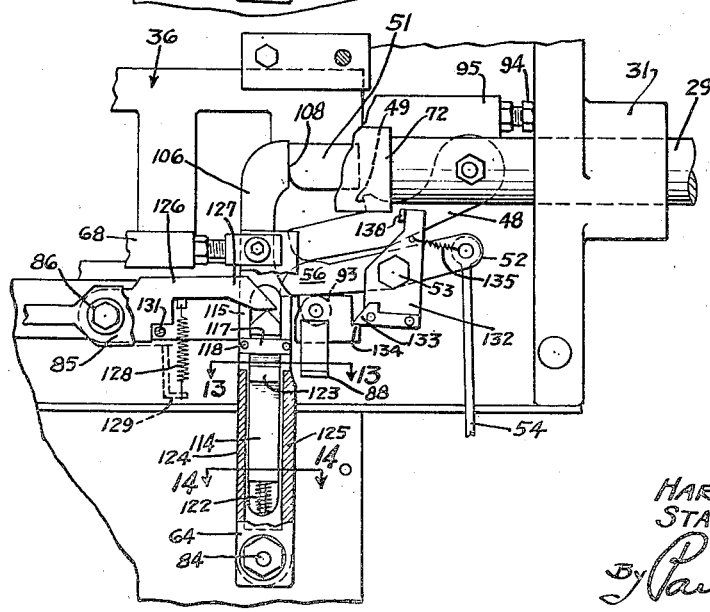
Fig. 6

Feb. 13, 1951     H. W. HOFFMAN ET AL     2,541,515
AUTOMATIC CLUTCH OPERATING MECHANISM
Filed Oct. 9, 1946     7 Sheets-Sheet 7

INVENTORS
HARRY W. HOFFMAN
STANLEY M. CUMMINGS
By Paul, Paul & Moore
ATTORNEYS

Patented Feb. 13, 1951

2,541,515

UNITED STATES PATENT OFFICE 2,541,515

AUTOMATIC CLUTCH OPERATING MECHANISM

Harry William Hoffman, Anoka, Minn., and Stanley M. Cummings, Long Beach, Calif., assignors to Federal Cartridge Corporation, Minneapolis, Minn., a corporation of Minnesota Application October 9, 1946, Serial No. 702,198

15 Claims. (Cl. 192—101)

This invention relates to new and useful improvements in clutch operating mechanisms, and more particularly to an improved clutch control for heavy machinery of the reciprocating type, such as punch presses, draw presses, shears, and the like, wherein a reciprocating work-performing member is driven by a suitable, constantly rotating prime-mover or motor which is connected to the reciprocating member of the machine through a suitable transmission and clutch.

In an apparatus of the above noted type, the clutch mechanisms are necessarily rugged, and require considerable energy for their manipulation; consequently, it has been customary to provide a control member capable of being manipulated by an operator, and at the will of the operator, for interposing a clutch control member in the path of operation of a constantly rotating or reciprocating member of the machine, thereby to utilize the large available energy of the machine for operating the clutch, at least to press-stopping position. In such machines the de-clutching operation may not be initiated instantaneously, when the clutch control mechanism is called upon to shift the clutch into de-clutching position, because the clutch control member must await the next cycle of movement of the press, and accordingly, should the operator move his control just after the instant a de-clutching operation could have taken place, the movement of the clutch mechanism to de-clutching condition cannot be initiated until the next cycle begins. Consequently, nearly two cycles may elapse as a maximum before the machine can be stopped.

Machinery of this character is satisfactory where slow speeds are utilized and where the machine is operated one stroke at a time with idle periods between strokes for regulating and inspecting the work. Where the machine is operated at high speeds, and especially where operated continuously, one stroke after another, the time available for inspection, adjustment and de-clutching, if necessary, is so short that wholly unsatisfactory results have been obtained, with much work spoilage and tool and die breakage as a result, to say nothing of the loss of production time on the machine. In addition, the use of automatic mechanical or electrical protective devices for inspecting and otherwise protecting the machine and the work, as the work is being progressed through the machine, are practical only when the machine can be stopped in time to prevent damage.

It is therefore an object of the present invention to provide an improved machine of the aforesaid general character, a quickly operable clutch operating mechanism whereby the de-clutching may be instantaneously initiated at any part of the stroke of the machine.

It is a further object to provide an automatic instantaneously operable clutch control mechanism capable of being adapted to existing machines with little alteration, and to provide such a control capable of utilizing available machine energy for instantaneously effecting a de-clutching operation by actuation of a suitable control element, either manual or automatic. It is also an object to provide an improved machine of the aforesaid character utilizing stored, instantaneously available energy for manipulation of a machine stopping control.

Other and further objects of the invention are those inherent in the apparatus herein illustrated, described and claimed.

Figure 3A:
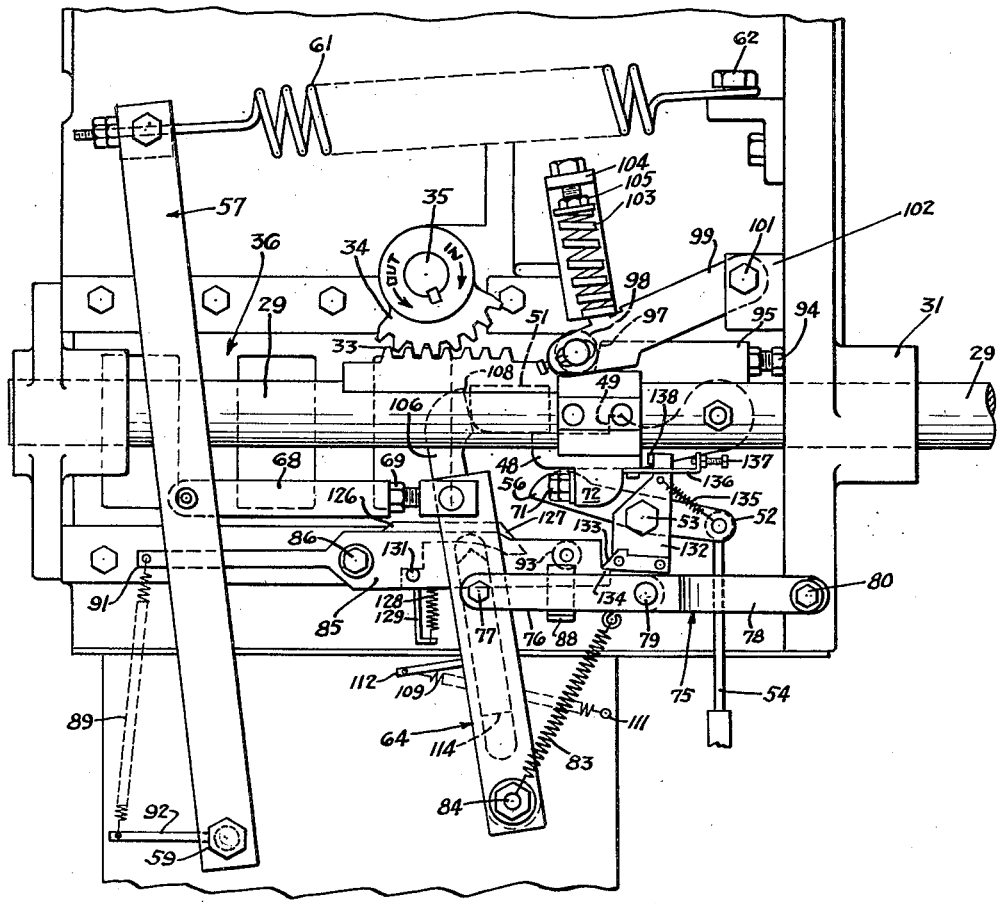
Figure 3 is an enlarged detail sectional view showing the means for manually actuating the usual clutch-operating rod and also showing our improved clutch rod operating mechanism as applied thereto in clutching condition.
Figure 3:
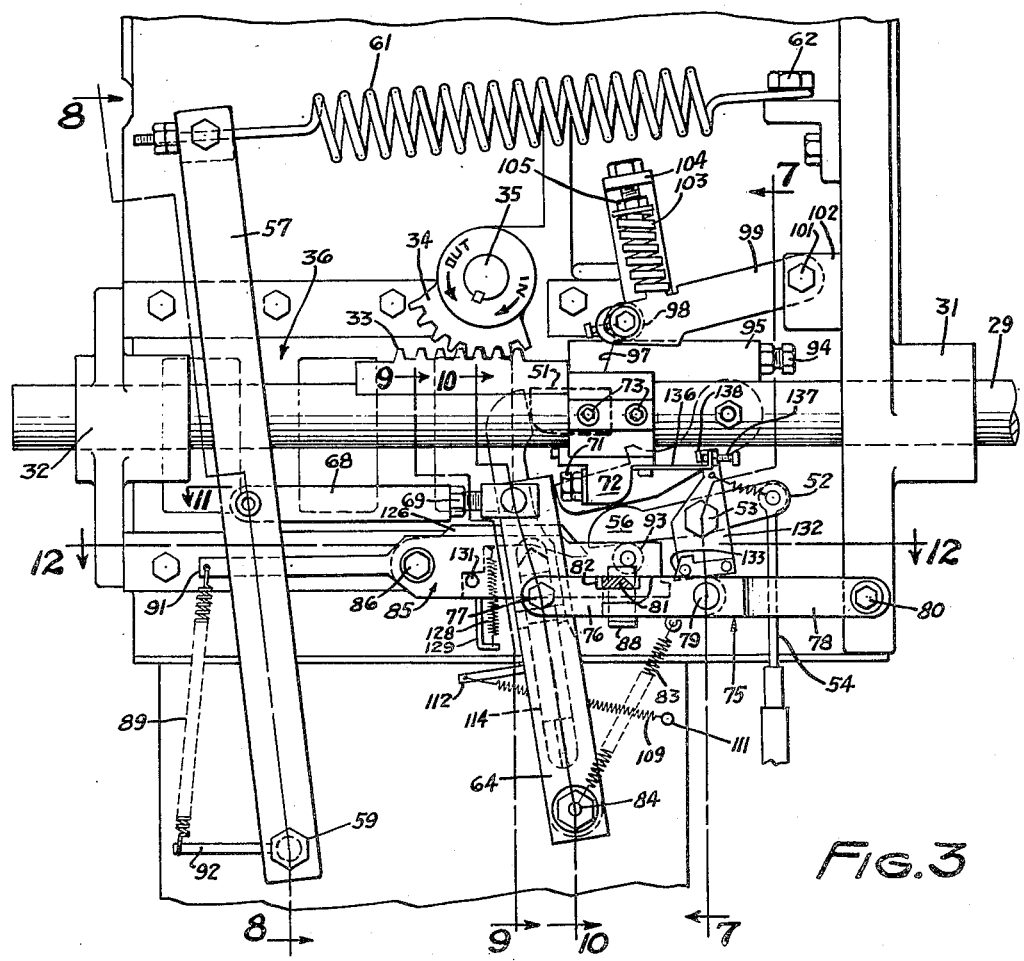
Figure 4:
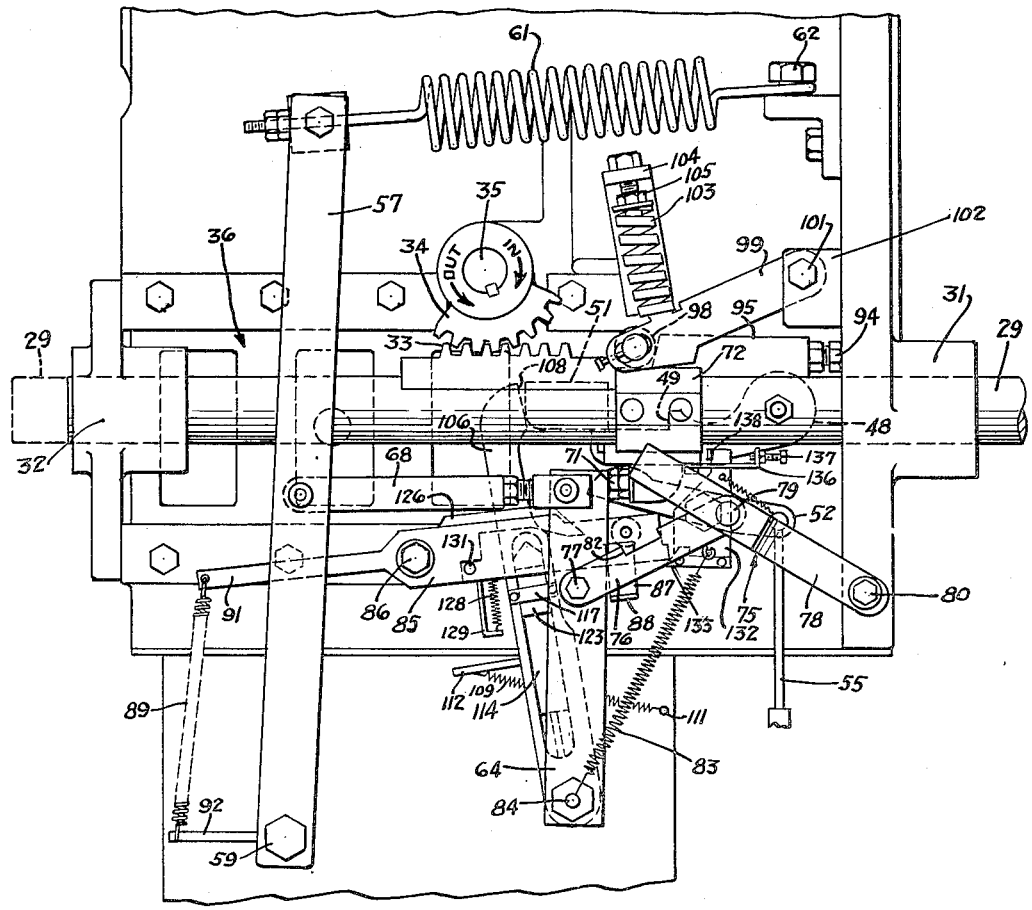
Figure 13:
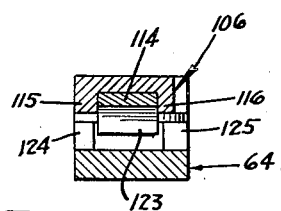
Figure 14:
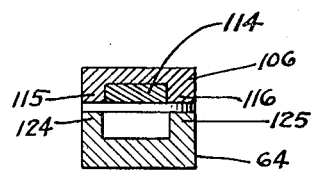
Figure 7:
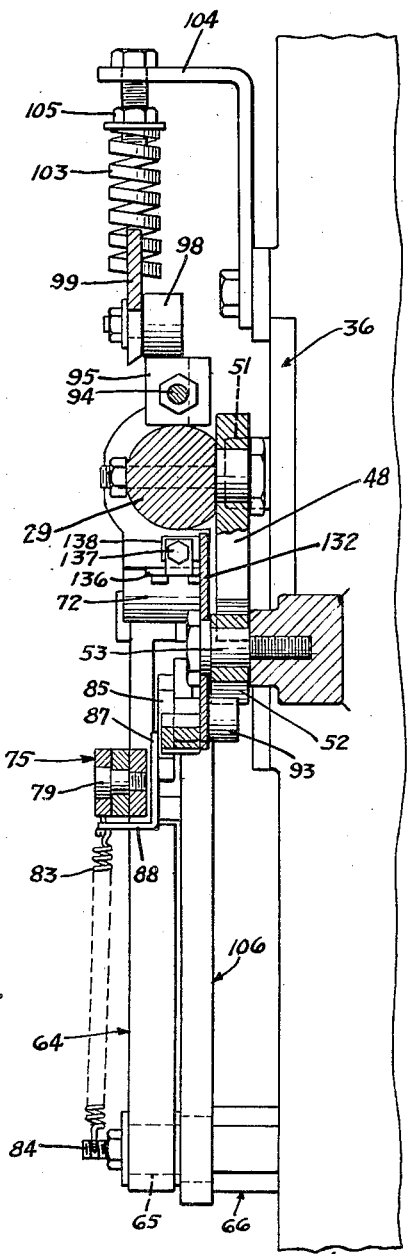

Figure 3—A is a view similar to Figure 3, but showing the clutch control member shifted to de-clutching position by the manual control and without releasing the main drive arm;

Figure 4 is a view similar to Figure 5, but showing the mechanism released instantaneously shifting the clutch operating rod into de-clutching position;

Figure 5 is a view similar to Figure 4 but showing the solenoid-actuated dog in clutching position, whereby the mechanism is conditioned to be automatically reset or cocked upon the next rearward movement of the shuttle bar;

Figure 6 is a detail view partially in section, showing the means for drivingly connecting the setup arm to the secondary drive arm;

Figure 7 is an enlarged detail sectional view on the line 7—7 of Figure 3, showing the auxiliary latch for engaging and preventing the control latch from releasing the secondary and primary drive arms, when the clutch operating rod is manually moved to de-clutching position;

Figure 8 is a vertical sectional view on the line 8—8 of Figure 3, showing the mounting of the primary drive arm;

Figure 9 is a vertical sectional view substantially on the line 9—9 of Figure 3, showing the mounting of the secondary drive arm and the setup arm;

Figure 10 is a vertical sectional view on the line 10—10 of Figure 3, showing the coupling member carried by the setup arm for operatively coupling the setup arm to the secondary drive arm;

Figure 11 is a detail sectional plan view on the line 11—11 of Figure 3, with some of the parts removed, showing the connection between the primary and secondary drive arms;

Figure 12 is a detail sectional plan view on the line 12—12 of Figure 3, showing the relative positions of the control latch and the toggle arm;

Figure 13 is an enlarged detail sectional view on the line 13—13 of Figure 6; and Figure 14 is an enlarged detail sectional view on the line 14—14 of Figure 6.

Figure 1:
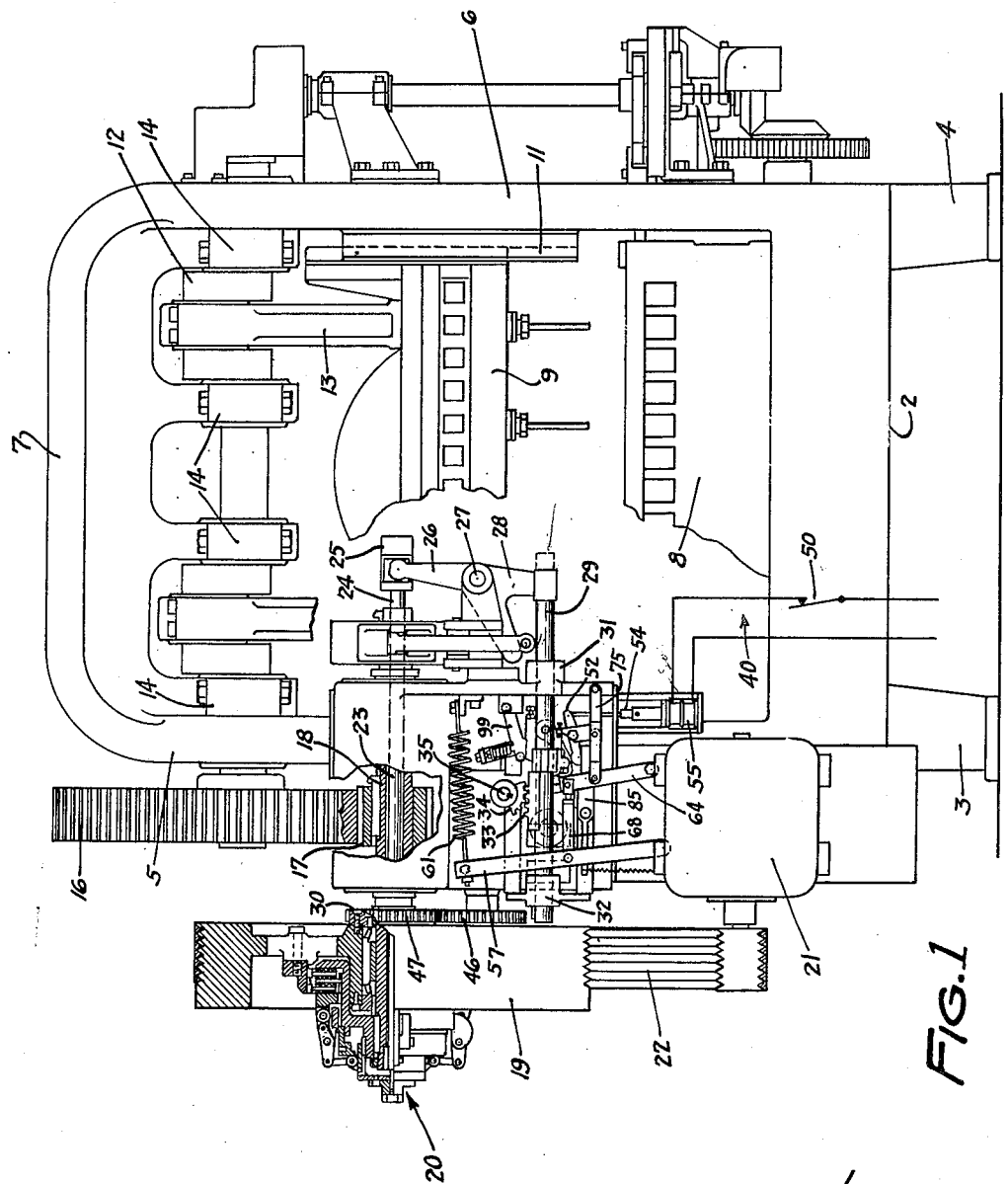
Figure 1 is a side elevational view of a conventional press showing our invention applied thereto.

In the selected embodiment of the invention herein disclosed, there is illustrated in Figure 1, for purpose of disclosure, a conventional machine of the type commonly known as a press, comprising a suitable base portion 2 shown mounted on legs 3 and 4, and having upright side frame members 5 and 6 shown connected together at their upper ends by a suitable cross member 7. The usual work table or bed 8 is shown supported on the base 2 in the usual manner, and a pressure member or ram 9 is mounted for vertical reciprocal movement above the work table in suitable guides 11. Reciprocal movement is imparted to the ram 9 by a crank shaft 12 through suitable connections 13.

The crank shaft 12 is shown mounted in suitable bearings 14 provided in the upper portion of the machine frame. A spur gear 16 is secured to one end of the crankshaft and meshes with a pinion 17 keyed to a hollow shaft 18. The shaft 18 is driven from a constantly rotating member such as the conventional fly-wheel 19, by a suitable clutch mechanism, generally designated by the numeral 20. The fly-wheel 19 may be driven from a suitable motor 21 by a belt drive 22.

A clutch operating rod 23 is mounted for sliding movement within the hollow shaft 18 and has one end operatively connected to the clutch mechanism 20 in any well known manner, whereby when the rod 23 is moved in one direction, the clutch will operatively connect the hollow shaft 18 to the fly-wheel 19 for direct rotation therewith, and when moved in the opposite direction, said rod will disengage the clutch whereby the fly-wheel will idle freely without imparting rotation to the shaft 18.

The opposite or inner end portion 24 of the clutch rod 23 is shown provided with a suitable member or head 25 having an operative connection with a forked arm 26 mounted for pivotal movement on a pivot 27, as illustrated in Figure 1.

The arm 26 is shown having a depending portion 28 adapted to be engaged by one end of a clutch control rod or shaft 29 slidable in fixed guides 31 and 32. Means is provided for manually operating the control rod 29 to control operation of the clutch, and is shown comprising a rack bar 33 secured to the clutch control rod 29 and meshing with a gear segment 34 secured to one end of a rock shaft 35. A suitable operating handle, not shown, may be secured to the rock shaft 35, as is customary. By rocking the shaft 35, longitudinal movement is imparted to the clutch control rod 29 whereby a similar movement, but in the opposite direction, is imparted to the clutch rod 23 through the arms 26—28.

In conventional machines of the type illustrated in Figure 1, means may be provided for automatically shifting the clutch control rod 29 to de-clutching position, to temporarily interrupt operation of the machine, in the event something goes wrong with the work, thereby to prevent damage to the work or machine. To thus automatically shift the control rod 29 to de-clutching position, the machine is shown provided with a shuttle bar 36 mounted for reciprocal movement in suitable guides 37 and 38 provided in the machine frame. The shuttle 36 is continuously operated by a crank pin 39 secured to one end of a shaft 41 driven from a shaft 42 by a pair of gears, generally designated by the numeral 43, and indicated in dotted lines in Figure 2.

The shaft 42 is driven from a shaft 44 by a pair of bevel gears 45, one of which is secured to the shaft 42 and the other to the shaft 44. A gear 46 is shown secured to one end of the shaft 44 and meshes with a similar gear 47 which may be secured directly to the hub of the fly-wheel 19 for direct rotation therewith, as indicated at 30 in Figure 1. By this arrangement it will be noted that the shuttle bar 36 is continuously reciprocated when the fly-wheel is in motion.

Under normal operating conditions, the rotary movement of the fly-wheel 19 provides the necessary power for shifting the clutch control rod 29 to de-clutching position, shown in Figures 4 and 5, when the usual trip means, next to be described, is actuated.

The trip means above referred to is shown comprising a dog 48 which is pivotally mounted on the clutch control rod 29, and has a shoulder 49 adapted to be moved into the path of a lug 51, carried by the shuttle bar 36, as indicated in dotted lines in Figure 4. A dog actuating arm 52 has its intermediate portion pivotally engaged with a stud 53 secured to the machine frame. A suitable connection 54 is shown operatively connecting one end of the arm 52 to a suitable solenoid 55, indicated in Figure 1. The opposite end portion 56 of the arm 52 is adapted to be moved upwardly into engagement with the bottom face of the dog 48, when the circuit to the solenoid is opened, whereby the shoulder 49 on the dog 48 is moved into the path of the shuttle lug 51, as indicated in Figure 4. When the shoulder 49 is thus positioned, the lug 51 on the shuttle bar will engage said shoulder upon its next forward stroke and thereby shift the clutch control rod 29 into de-clutching position, shown in Figures 4 and 5.

Figure 2:
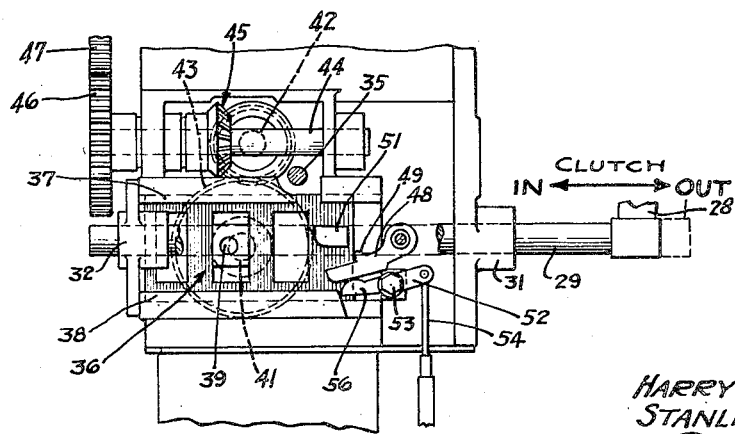
Figure 2 is a detail view showing the shuttle bar and the means for driving it.

The solenoid 55 is preferably so arranged (but not necessarily) that when energized, it retains the dog-actuating arm 52 in clutching position, shown in Figure 2, and when de-energized, moves said arm into de-clutching position whereby the shoulder 49 of the dog 48 is moved into the path of the solenoid lug 51, as hereinbefore described, and as shown in Figure 4.

De-energization of the solenoid may be automatically effected by electric means, such as a well known electric eye, not shown, positioned to be actuated by accidental interruption or failure of the work in its normal travel through the machine, or in the event the machine fails to perform its prescribed function on the work, whereby operation of the work performing member of the machine will be interrupted when the shuttle bar 36 engages the dog 48 of the control rod 29, upon its next forward movement of the shuttle bar.

To afford a clearer explanation of the operation of the clutch control mechanism, we have diagrammatically indicated in Figure 1, a solenoid circuit, generally designated by the numeral 40, having a control switch 50 therein. The circuit 40 may be connected to a suitable source of energy such as the supply circuit to the motor 21, not shown. The switch 50 is preferably so associated with the operating lever (not shown) secured to the shaft 35 that upon initial movement of said lever towards de-clutching position, the switch 50 is opened, whereupon the solenoid is de-energized and instantly moves the dog 48 into position to be engaged by the shuttle lug 51 upon the next forward movement of the shuttle bar 36. The opening and closing of the switch 50 is therefore accomplished by manipulation of the control lever on the rock shaft 35, although in some instances it may be arranged for independent operation, if desired. All of the above described mechanisms and controls are more or less well known in the art, and it is therefore deemed unnecessary herein to further describe them in detail.

The shuttle bar in the usual press, as previously stated, oscillates back and forth in timed relation in respect to rotation of the flywheel, and hence it is only at those times when the shuttle 36 and lug 51 carried thereon are moving to the right, in Figure 2, that movement of the control rod 29 to clutch disengaging position can be effected. Accordingly, in the usual press, the clutch can be disengaged by power of the press only at certain instances in the press motion cycle, and this is a disadvantage, since instantaneous de-clutching is not thereby afforded.

One of the important features of the present invention resides in the provision of a novel and simple mechanism operable in conjunction with the usual clutch control means of the machine for instantaneously moving the clutch control rod 29 into de-clutching position to instantaneously interrupt movement of the work performing member 9, the instant the solenoid 55 is de-energized, whether manually or automatically, and independently of the reciprocal movement of the shuttle bar 36.

The means provided for thus automatically instantaneously shifting the clutch control rod 29 into de-clutching position, independently of the reciprocal movement of the shuttle bar, is shown comprising an arm 57, which will hereafter be referred to as the "primary drive arm." This arm is shown having a bearing sleeve 58 secured to its lower end which is pivotally mounted on a stud 59 secured to the machine frame, as best shown in Figure 8. One end of a relatively heavy spring 61 is shown adjustably connected to the upper end of the drive arm 57 and the opposite end of said spring is fixed to the machine frame by suitable means such as a bolt or stud 62. The spring 61 is fashioned to constantly exert a force on the arm 57 to move it in a direction towards the right, when viewed as shown in Figures 3, 4 and 5, or into de-clutching position. When the primary drive arm 57 is in the position shown in Figure 3, the tension in the spring 61 provides the auxiliary power or force for automatically shifting the clutch control rod 29 into de-clutching position, as will subsequently be described.

Another arm, generally designated by the numeral 64, and which will hereinafter be referred to as the "secondary drive arm," is shown mounted on the outer reduced end portion 65 of a shouldered stud 66 secured to the machine frame, as indicated at 67. The upper end of the secondary drive arm 64 is operatively connected to the intermediate portion of the primary drive arm by a connection 68, one end of which is shown longitudinally adjustable, as indicated at 69 in Figures 3, 4 and 5. The upper end of the secondary drive arm 64 is positioned to engage an abutment screw 71, adjustably mounted in a member 72 fixedly secured to the clutch control rod 29 by such means as screws or bolts 73.

Under normal operating conditions, the abutment screw 71 is so positioned in the member 72 as to provide a small gap between it and the adjacent face of the secondary drive arm 64, as will be understood by reference to Figure 3. When the primary drive arm 57 is released, the secondary drive arm 64 will engage the abutment screw 71 of the member 72 and thereby instantly shift the clutch control rod 29 into de-clutching position by the action of the spring 61, as shown in Figures 4 and 5.

Means are provided for retaining the primary drive arm 57 in energy-storing position, as shown in Figure 3, and comprises a toggle arm, generally designated by the numeral 75. The toggle arm 75 comprises a link 76 having one end pivoted to the secondary drive arm 64 by a suitable pivot or pin screw 77. The opposite end of the link 76 is pivoted to its complementary toggle link 78 by a pivot pin 79. The opposite end of the toggle link 78 is pivotally connected to a fixed pivot pin 80 suitably mounted in the machine frame. One end of the toggle link 78 is shown forked or split, as best indicated in Figure 12, thereby to receive the adjacent end of the relatively smaller toggle link 76.

A cross connection or tie 81 is provided at the free end of the forked end of the toggle link 78 adapted to be received in a recess 82 provided in the upper edge of the link 76, and whereby the toggle arm 75, when in operative position as shown in Figure 3, is retained in extended or locking position with the axes of the pivot pins 77, 79 and 80 substantially aligned. The toggle arm 75 thus serves to lock the primary drive arm 57 in energy-storing position whereby the arm 57 is conditioned for instantaneous operation to shift the clutch control rod 29 into de-clutching position, the instant the toggle arm is broken by actuation of the control means or solenoid 55, as will subsequently be described.

A suitable spring 83 has one end connected to the link 76 of the toggle arm 75 and its opposite end to a fixed element such as a projection 84 provided on the stud 66, whereby the spring 83 constantly tends to straighten the toggle arm or move it into operative position to cock the primary and secondary drive arms 57 and 64, respectively, as shown in Figure 3.

Means are provided for automatically "breaking" the toggle arm 75, the instant when the solenoid 55 is actuated to swing the end portion 56 of the arm 52 upwardly into the position shown in Figure 4, whereby the primary drive arm 57 is released to thereby instantaneously move the secondary drive arm 64 into engagement with the abutment screw 71 and thereby shift the clutch control rod 29 into de-clutching position shown in Figures 4 and 5, regardless of the position of the shuttle lug 51 with respect to the position of the shoulder 49 on the dog 48.

The means provided for thus breaking the toggle arm is shown comprising a control latch 85 pivoted on a stud 86 secured to the machine frame and carrying adjacent one end thereof a depending bracket 87 having its lower end portion 88 offset and extending beneath the link 76 of the toggle arm 75, as shown in Figures 3, 4, 5 and 7.

A spring 89 has one end connected to the end portion 91 of the control latch 85 and its opposite end is shown connected to a pin 92, which, for convenience, may be secured to the bearing sleeve 58 of the primary drive arm 57, as will be understood by reference to Figures 3, 4 and 5. The spring 89 constantly tends to swing the opposite end of the control latch 85 upwardly to cause the offset portion 88 of the bracket 87 to engage and break the toggle 75.

When the parts are in clutching position, as shown in Figure 3, the end portion 56 of the dog-actuating arm 52 is held in engagement with a roller 93 mounted on the adjacent end of the control latch 85. The downward pressure exerted on the roller 93 by the arm 52 is sufficient to overcome the tension of the spring 89, whereby so long as the arm 52 is retained in the position shown in Figure 3 by the solenoid, the control latch 85 is retained in substantially a horizontal position, or in a position whereby the offset end portion 88 of the bracket 87 secured thereto cannot engage and break the toggle arm. The instant, however, that the solenoid is de-energized, the end portion 56 of the dog-actuating arm 52 is swung upwardly, thereby releasing the roller 93 and permitting the spring 89 to swing the control latch 85 into the position shown in Figure 4. Such movement of the control latch 85 will cause the portion 88 of the bracket 87 to engage the bottom of the toggle link 76 and thereby break the toggle arm, whereupon the primary and secondary drive arms 57 and 64 are released to instantaneously shift the clutch control rod 29 into de-clutching position, as a result of the secondary drive arm 64 impinging against the abutment screw 71 carried by the clutch control rod.

Because of the sudden shifting of the clutch control rod 29 from clutching to de-clutching position by the action of the primary drive arm 57, when said arm is released, means is provided for preventing the clutch control rod 29 from rebounding when it reaches the limit of its forward movement, determined by a stop screw 94 received in threaded engagement with an extension 95 provided on the member 72 carried by the clutch control rod 29. The stop screw 94 is adapted to engage a fixed portion of the machine frame, when the clutch control rod 29 is in de-clutching position, as best shown in Figures 4, 5 and 6.

The opposite end of the extension 95 is formed with an inclined face 97 adapted to be engaged by a roller 98, as shown in Figures 4, 5 and 6. The roller 98 is carried by one end of a spring-actuated detent arm 99, mounted on a pivot 101 secured to a bracket 102 suitably fixed to the machine frame. A spring 103 has one end seated against the upper face of the detent arm 99 and its opposite end adjustably supported in a fixed bracket 104 by an adjusting screw 105. The roller 98 is preferably adjustably mounted in the arm 99 to facilitate properly positioning the clutch control rod 29 when in de-clutching position.

When the clutch control rod 29 is in clutching position, as shown in Figure 3, the roller 98 of the detent arm 99 will engage the upper edge of the extension 95 under the tension of the spring 103. When the clutch control rod 29 is shifted to de-clutching position, the roller 98 drops into engagement with the inclined face 97 of the extension 95 which occurs at about the instant the limit stop 94 engages the frame, as shown in Figure 5. Such engagement of the detent roller 98 with the inclined face 97 prevents any possibility of the clutch control rod 29 rebounding, when the limit stop strokes the machine frame, as will be understood by reference to Figure 5.

Means is provided for automatically resetting or recocking the primary drive arm 57 each time it has been released to automatically shift the clutch control rod 29 into de-clutching position.

The means provided for thus resetting or recocking the primary drive arm is shown comprising an arm 106, which will hereinafter be referred to as the setup arm. The lower end of this arm is pivotally mounted on the intermediate portion 107 of the stud 66 and is shown spaced from the secondary drive arms 64 by a suitable washer 110, as best shown in Figure 10. The upper end of the setup arm 106 is preferably shaped as shown in Figure 6, whereby it has a face 108 positioned in the path of the drive lug 51 of the shuttle bar 36. A spring 109 has one end fixed to a stud 111 secured to the machine frame and its opposite end operatively connected to the intermediate portion of the setup arm 106 through a stud 112 fixed to the arm and a pin 113 secured to the stud 112 and laterally extending therefrom as shown in Figure 9. The setup arm 106 is mounted to oscillate on the stud 66, and the spring 109 serves to constantly urge the face 108 of the arm 106 into engagement with the lug 51 of the shuttle bar.

The shuttle bar 36, as hereinbefore stated, reciprocates continuously as result of its driving connection with the fly-wheel through the gears 43, 45 and 46—47, whereby the setup arm may oscillate between the positions shown in Figures 3 and 5, which represents the length of reciprocal travel of the shuttle bar 36.

The reciprocal movement of the shuttle bar 36 provides the necessary energy or power for resetting or recocking the primary drive arm 57 against the tension of the spring 61, when the secondary drive arm 64 is operatively coupled to the setup arm 106, as will next be described.

To provide a driving connection between the setup arm 106 and the secondary drive arm 64, a coupling member 114, shown in full lines in Figure 6, is slidably mounted between suitable guides 115 and 116 provided on the setup arm 106, as best illustrated in Figures 13 and 14. The coupling member 114 is retained in position between the guides 115 and 116 by a strap 117 which preferably is fitted into recesses provided in the faces of the guides 115 and 116 and secured therein by suitable means such as screws 118. The lower end of the coupling member 114 is provided with a longitudinally extending aperture 119 adapted to receive the upper end of a pin 121 whose lower end may be fixed in the lower portion of the setup arm 106, as will be understood by reference to Figure 10. A spring 122 is shown coiled about the pin 121 between the bottom end of the coupling member 114 and the bottom of the recess provided in the setup arm 106, whereby the spring constantly exerts an upward force on the coupling member 114 to move it into its uppermost position, shown in Figures 3, 4, 5 and 10.

The coupling member 114 has a laterally projecting drive lug 123 which provides the driving connection between the setup arm 106 and the secondary drive arm 64, when the coupling member 114 is in its lowered position, shown in Figure 6. When the coupling member 114 is in its uppermost position, the lug 123 may be in engagement with the bottom edge of the strap 117, as shown in Figures 3 and 10.

The secondary drive arm 64 is formed with spaced parallel flanges 124 and 125, as best shown in Figures 6, 13 and 14, and the upper end of the flange 124 is spaced downwardly from the strap 117 a distance slightly greater than the up-and-down width or thickness of the lug 123 of the coupling member 114. In other words, the spacing between the upper end of the flange 124 and the strap 117 is such that when the lug 123 is in its uppermost position, as shown in Figure 10, it may freely pass between the strap 117 and the top end of the flange 124 of the secondary drive arm 64 whereby it does not impart any movement of the secondary drive arm. To facilitate machining, we have also shown the upper end of the flange 125 spaced downwardly from the strap 117.

Thus, when the parts are in the positions shown in Figure 4, the setup arm 106 may oscillate freely between the positions shown in Figures 4 and 5 without imparting any motion to the secondary drive arm 64. This results because when the drive lug 123 of the coupling member is in its uppermost position, it may pass freely back-and-forth over the upper end of the flange 124 of the setup arm, as will be understood by reference to Figures 9 and 10. When the setup arm is thus uncoupled from the secondary drive arm the spring 109 holds the upper end thereof in engagement with the drive lug 51 of the shuttle bar 36, as will be understood by reference to Figures 3, 4, 5 and 6.

To drivingly connect the setup arm 106 to the secondary drive arm 64, the coupling member 114 must be moved downwardly to position its driving lug 123 beneath the upper end of the flange 124 of the secondary drive arm, as shown in Figure 6, whereby the lug 123 may engage the inner face of the flange 124 and thereby return the secondary and primary drive arms to locked or declutching positions, as shown in Figure 3.

The means provided for relatively downwardly moving the coupling member 114 in the setup arm 106 against the tension of its spring 122 is shown comprising an element 126 which will hereinafter be referred to as the pressure element. The pressure element 126 is shown having one end pivotally supported on the stud 86 upon which the control latch 85 is mounted, as best shown in Figure 12. The opposite end portion or head 127 of the element 126 is positioned over the coupling 114 and is adapted to engage the uppermost end thereof and downwardly press the coupling member 114 in the setup arm 106 against the tension of the spring 122, upon swinging movement of the setup arm in a direction towards the right, when viewed as shown in Figures 3, 4 and 5, provided the control latch 85 is in the position shown in Figures 3 and 5. Such relative downward movement of the coupling member 114 in the setup arm 106 will position the drive lug 123 of the coupling member in driving relation to the flange 124 of the secondary drive arm 64, as shown in Figure 6.

A spring 128 has one end connected to the pressure element 126 and its opposite end to the lower end of a bracket 129 depending from and fixed to the lower edge of the control latch 85, as shown in Figures 3, 4, 5 and 6. A pin 131 may be secured in the control latch 85 to limit the downward movement of the pressure element 126, as will be understood by reference to Figure 6.

An important feature of the construction shown in Figure 6 resides in the relative strengths of the two springs 122 and 128. The spring 128 of the pressure element 126 must be relatively greater than the tension or strength of the spring 122 so that when the control latch 85 is actuated to permit the pressure element 126 to downwardly press the coupling member 114, as shown in Figure 6, it may do so against the tension of the spring 122. In other words, the tension of the spring 128 must be such as to overcome the tension in the spring 122 in order that the pressure element 126 may downwardly move the coupling member in the setup arm, when called upon to do so.

An auxiliary latch member 132 is shown pivotally mounted on the pivot pin 53 supporting the actuating arm 52 of the dog 48. The auxiliary latch is provided at its lower end with an offset detent 133 adapted to engage a shoulder 134 provided on the adjacent end of the control latch 85, as shown in Figures 5 and 6. A small spring 135 may be interposed between the upper end of the auxiliary latch 132 and the pivot pin connecting the dog actuating arm 52 to the connection 54, as shown in Figure 6, to constantly urge the detent 133 of the auxiliary latch into locking engagement with the shoulder 134 on the control latch 85. The auxiliary latch 132 serves to lock the control latch 85 in its horizontal locking position, shown in Figures 5 and 6.

When the clutch control rod 29 is manually shifted from clutching to de-clutching position by manipulation of the rock shaft 35, as shown in Figure 3—A, the auxiliary latch member 132 instantaneously moves into locking engagement with the adjacent end of the control latch 85 whereby the control latch cannot break the toggle link 75, in the event the dog actuating arm 52 is subsequently moved into de-clutching position, as shown in Figure 4, while the clutch control rod 29 is in de-clutching position.

The auxiliary latch member 132 thus prevents the unnecessary release of the primary and secondary drive arms 57 and 64, respectively, in the event the clutch control rod is manually shifted from clutching to declutching position by manual manipulation of the rock shaft 35.

To condition the primary and secondary drive arms for instant release to instantaneously automatically shift the control rod 29 from clutching to de-clutching position, upon actuation of the solenoid switch 50, means is provided for rendering the auxiliary latch member 132 inoperative when the parts are in cocked positions, as shown in Figure 3. By reference to this figure, it will be noted that the detent 133 of the auxiliary latch 132 has been moved out of engagement with the shoulder 134 of the control latch 85, whereby the control latch 85 may be swung upwardly by the spring 89 to break the toggle link 75, when released to do so as when the end portion 56 of the dog-actuating arm 52 is swung out of engagement with the roller 93, upon de-energization of the solenoid 55. Such upward swinging movement of the control latch 85 will cause the toggle link 75 to be broken as result of the lower end portion 88 of the bracket 87 of the control latch engaging the arm 76 of the toggle link 75 and thereby breaking the toggle link and releasing the primary and secondary drive arms 57 and 64, respectively, as shown in Figures 4 and 5.

To thus render the auxiliary latch element 132 ineffective to lock the control latch 85 in operative position, an extension arm 136 is provided on the member 72 secured to the clutch control rod 29, and is shown having a suitable abutment screw 137 adjustably secured to the outer end thereof. The terminal of the adjusting screw 137 is adapted to engage an offset lug 138 provided on the upper end of the auxiliary latch element 132. This lug is so positioned with relation to the abutment screw 137 on the extension arm 136, that when the clutch control rod 29 is shifted into clutching position, shown in Figure 3, the abutment screw 137 will engage the lug 138 in the upper end of the auxiliary latch 132 and thus disengage the detent 133 of the latch element from the shoulder 134 of the control latch 85, as will readily be understood by reference to Figure 3.

Immediately upon manual shifting of the clutch control rod 29 from clutching position, shown in Figure 3, to de-clutching position shown in Figures 5 and 6, the auxiliary latch 132 is released from the screw 137 whereupon the spring 135 thereof instantly moves the auxiliary latch element into position whereby its detent 133 will engage the shoulder 134 of the control latch 85, and thus prevent the unnecessary release of the primary and secondary drive arms, each time the clutch control rod 29 is manually shifted into de-clutching position by the operator.

In accordance with conventional practice, we have herein shown and described the solenoid 55 as being energized during each working period of the machine, whereby it must be de-energized to effect each de-clutching operation of the clutch control rod 29, but it is to be understood that it may be otherwise connected with the usual manual or automatic control devices without departing from the scope of the invention.

*Operation*

As hereinbefore stated, in conventional machines of the character herein disclosed, the actual shifting of the clutch control rod 29 is accomplished by the shuttle bar 36 as a result of its driving lug 51 engaging the shoulder 49 of the clutch dog 48. Such shifting of the clutch control rod 29 has not been satisfactory in high speed machines because of the delayed action of shifting the clutch control rod 29, which may result in the event the clutch dog 48 is moved into de-clutching position when the drive lug 51 of the shuttle bar 36 has passed by the shoulder 49 of the dog 48, during the forward movement of the shuttle bar. When such a contingency arises, the clutch control rod 29 cannot be shifted by the shuttle bar until the shuttle bar commences its next cycle of reciprocal movement, and consequently a delayed action may result in the shifting of the clutch control rod from clutching to de-clutching position.

By the employment of the novel invention hereindescribed the danger of delayed clutch action is positively eliminated, and each time the solenoid control switch is opened, the clutch control rod 29 is instantaneously shifted from clutching to de-clutching position regardless of the position of the shuttle bar.

To accomplish the above results, the release of the primary and secondary drive arms 57 and 64, respectively, from cocked to clutching positions, shown in Figure 3, to de-clutching position, is effected by opening of the solenoid switch 50, as hereinbefore described. Such opening of the solenoid switch 50 causes the clutch dog actuating arm to release the control latch 85, whereupon the latter instantly breaks to toggle link 75, as shown in Figures 4 and 5, and thus permits the secondary drive arm instantaneously to shift the clutch control rod 29 into de-clutching position, independently of any action of the shuttle bar 36.

The control latch 85 which provides the means for breaking the toggle link 75, is retained in horizontal or cocked position as shown in Figures 3, 5 and 6, when the solenoid is energized, because of the end portion 56 of the dog actuating arm 52 engaging the roller 93 mounted on the adjacent end of the control latch. The toggle link is normally retained in operative position by the action of the spring 83 whereby an upward force must be exerted on the toggle link to break it and cause it quickly to release the primary and secondary drive arms from their operative positions, shown in Figure 3. When the primary and secondary drive arms 57 and 64, respectively, are in operative or clutching positions, the main power spring 61 is extended and thus has energized or conditioned the primary drive arm for immediate action to shift the clutch control rod 29 into de-clutching position, the instant it is called upon to do so by the solenoid.

When the solenoid circuit is opened by the will of the operator or by some automatically operable control device, the usual spring of the solenoid will instantaneously swing the dog actuated element 52 from the position shown in Figure 3 to that shown in Figure 4, whereby the adjacent end of the clutch control latch 85 is swung upwardly to the position shown in Figure 4, by the action of the spring 89 secured to the opposite end portion 91 thereof. Such upward swinging movement of the control latch 85 will cause the offset end portion 88 of the bracket 87 of the control latch to engage and break the toggle link, thereby instantaneously releasing the primary and secondary drive arms 57 and 64, whereby the secondary drive arm will engage the abutment screw 71 of the abutment member 72, carried by the clutch control rod 29, and thereby instantaneously shift the control rod into de-clutching position, independently of any action of the shuttle bar, and regardless of the position of the shuttle bar with respect to the clutch dog 48.

In this automatic and instantaneous opening action, lug 51 on shuttle bar has no effect upon dog 48 since the clutch control rod 29 is driven smartly to clutch-out position by the hammer blow of secondary drive arm 64 upon screw 71 (carried by lug 72 on rod 29). As the clutch control rod moves to the right (towards clutch-open position, it merely drags dog 48 along with it. Indeed, dog 48 can be removed from the apparatus once the automatic and instantaneous clutch opening device of this invention has been installed.

So long as the solenoid switch 50 is retained in circuit opening position the primary and secondary drive arms will remain in de-clutching position, as shown in Figures 4 and 5, because when the solenoid switch is open the solenoid will retain the dog actuating arm 52 in the position shown in Figure 4, whereby the control latch 85 is retained in the position shown in Figure 4 by the spring 89.

Immediately upon closing of the solenoid switch 60 the clutch dog actuating arm 52 is swung to the position shown in Figures 3 and 5, whereby its end portion 56 engages the roller 93 of the control latch 85, and thus positions the control latch for cocking or resetting the primary and secondary drive arms 57 and 64, respectively. Such resetting of the drive arms 57 and 64 is effected automatically by drivingly connecting the setup arm 106 to the secondary drive arm 64 through the medium of the coupling member 114.

Such automatic coupling together of the setup arm 106 and secondary drive arm 64 results following resetting of the control latch 85, upon the next forward movement of the shuttle bar 36, because the head or end portion 127 of the pressure element 126 then engages the upper end of the coupling member 114 and presses said member downwardly between the flanges 124 and 125 of the secondary drive arm, as shown in Figure 6, whereby the drive dog 123 of the coupling member is moved into the path of the upper end of the flange 124 of the secondary drive arm. When the coupling member is thus pressed downwardly in the secondary drive arm, the setup arm 106 is drivingly connected or coupled to the secondary drive arm through the lug 123 and flange 124, whereby upon the next rearward movement of the shuttle bar 36, the secondary drive arm 64 is moved from its released position shown in Figures 4 and 5, to the position shown in Figure 3, in which position it will be reset or cocked by straightening of the toggle link 75 under the influence of the spring 83. Such resetting of the secondary drive arm will effect a similar resetting of the primary drive arm as a result of being connected thereto by the connection 68.

Such resetting of the primary and secondary drive arms may be accomplished even though the clutch control rod 29 is retained in de-clutching position, as will be noted by reference to Figure 3—A.

The clutch control rod is preferably so associated with the control mechanism that each time it has been shifted into de-clutching position, whether manually or automatically, it must be manually returned to clutching position, shown in Figures 1 and 3.

From the foregoing it will therefore be understood that the novel clutch operating mechanism herein-described, is adapted for either manual or automatic operation, or both, and serves to positively instantaneously shift the clutch control rod 29 into de-clutching position the instant the control device such as the solenoid switch 50 is opened, whether by the operator, or by automatic means which may be rendered operative as a result of failure of the machine to perform its prescribed function upon the work.

It will be apparent to those skilled in the art that we have accomplished at least the objects of our invention, and that the embodiments herein described may be variously changed and modified without departing from the spirit of the invention, and that the invention is capable of uses and has advantages not herein specifically described; hence it will be appreciated that the herein disclosed embodiments are illustrative only, and that our invention is not limited theerto.

What we claim is:

1. A work performing machine having a frame, a work member movably mounted on said frame and normally movable cyclically through a prescribed path, a constantly movable power source on said frame adapted to be connected through a clutch to the work member, said clutch being provided with a clutch control member movable in opposite directions to clutching and de-clutching positions, a manual control for moving the clutch control member to clutching or de-clutching position, automatic means connected to said clutch control member, said automatic means including a source of potential instantly available energy for moving said clutch control member only in the direction to de-clutch the machine at any time during the cyclical operation of the machine, and detent means for restraining movement of said automatic means from such de-clutching when the clutch control member is manually moved into de-clutching position.

2. A work performing machine having a frame, a work member movably mounted on said frame and movable cyclically through a prescribed path, a constantly movable power source on said frame adapted to be connected through a clutch to the work member, said clutch being provided with a clutch control member movable in opposite directions to clutching and de-clutching positions, a manual control for moving the clutch control member to its clutching or de-clutching positions, spring means, means capable of connecting said spring means to the constantly movable power source for moving the spring means to energy-storing position, control means for connecting said spring means to said clutch control member whereby the spring means can move the clutch control means to de-clutching position only, at any time during the cyclical operation of the machine, and detent means operable to engage said spring means for restraining said de-clutching movement thereof when the clutch control member is manually moved to de-clutching position.

3. A work performing machine having a frame, a work member movably mounted on said frame and movable cyclically through a prescribed path, a constantly movable power source on said frame adapted to be connected through a clutch to the work member, said clutch being provided with a clutch control member movable in opposite directions to clutching and de-clutching positions, a manual control for moving the clutch control member, a power spring, connection means attached to said spring and mounted on the frame, said connection means being engageable to a part of the constantly movable power source for moving said spring to energy-storing condition, means for restraining said connection means and spring in said energy-storing condition, control means movable at any time during the cyclical operation of the machine for releasing said restraining means to allow movement of said connection means under influence of the spring, said connection means being positioned to impart its motion to the clutch control member and move the latter to de-clutching position, and a detent operable when the clutch control member is manually moved to de-clutching position to lock the spring and connection means against movement to de-clutching position.

4. In a work performing machine of the type having a reciprocating work performing head driven through repeated cycles of operation from a constantly revolving power source through a clutch having a clutch control member movable to clutching and de-clutching positions, manual means for moving said clutch control member, a part on said machine having a periodically available motion, and means capable of connecting said clutch control member to said part for moving the clutch control member to de-clutching position when the motion of said part is available, the improved clutch operating mechanism comprising an energy-storing member, means for connecting said energy-storing member to the clutch control member whereby manual shifting of the clutch control member to clutch-engaging position will move the energy-storing member to energy-storing condition, detent means for restraining said member in energy-storing condition, said energy-storing member when released being movable along a path, under the influence of its stored energy, to engage the clutch control member at any time during the cycle of motion of the work performing head and instantly shift the clutch control member to de-clutching position.

5. In a work performing machine of the type having a reciprocating work performing head driven through repeated cycles from a constantly revolving power source through a clutch having a clutch control member movable to clutching and de-clutching positions, manual means for moving said clutch control member, a part on said machine having a periodically available motion, an improved clutch operating mechanism comprising an energy-storing member, means for connecting said energy-storing member to a movable element of the machine for a time period at least sufficient to move said member to energy-storing condition, detent means for restraining said member in energy-storing condition, said energy-storing member and connecting means having a path of motion such that when it is released and moves it engages the clutch control member and shifts it to de-clutching position, and an interlock between said clutch control means and detent for restraining the detent in a position such that it holds said energy-storing means in energy-storing condition when the clutch control member is moved to de-clutching position by said manual means.

6. A work performing machine of the type having a reciprocating work performing head driven through repeated cycles of operation from a constantly revolving power source through a clutch having a clutch control member movable to clutching and de-clutching positions, manually operable means for effecting movement of said clutch control member, a part on said machine having a periodically available motion, the improved clutch operating mechanism comprising a spring mounted on the machine, connection means attached to said spring and having a path of motion such that when moved by said spring it will engage the clutch control member and move it to de-clutching position, movable means for operatively connecting the connection means to said periodically movable part to move the spring and said connection means to a position wherein energy is stored in the spring, a toggle arm connected to the connection means and to a fixed part of the machine frame for holding the connection means in energy-storing position when the toggle arm is in straightened condition, and a control latch for breaking the toggle arm at any time during the cycle of operation of the machine whereby said connection means is released to thereby engage and shift the clutch control member into de-clutching position.

7. A work performing machine of the type having a reciprocating work performing head driven through repeated cycles of operation from a constantly revolving power source through a clutch having a clutch control member movable to clutching and de-clutching positions, manually operable means for effecting movement of said clutch control member, a part on said machine having a periodically available motion, the improved clutch operating mechanism comprising a spring mounted on the machine, connection means attached to said spring and having a path of motion such that when moved by said spring it will engage the clutch control member and move it to de-clutching position, movable means for operatively connecting the connection means to said periodically movable part to move the spring and said connection means to a position wherein energy is stored in the spring, a toggle arm connected to the connection means and to a fixed part of the machine frame for holding the connection means in energy-storing position when the toggle arm is in straightened condition, a control latch for breaking the toggle arm whereby at any time during the cycle of operation of the machine said connection means is released to shift the clutch control member into de-clutching position, and a solenoid-operated element for controlling operation of the control latch.

8. A work performing machine of the type having a reciprocating work performing head driven through repeated cycles of operation from a constantly revolving power source through a clutch having a clutch control member movable to clutching and de-clutching positions, manually operable means for effecting movement of said clutch control member, a part on said machine having a periodically available motion, the improved clutch operating mechanism comprising a spring mounted on the machine, connection means attached to said spring and having a path of motion such that when moved by said spring it will engage the clutch control member and move it to de-clutching position, movable means for operatively connecting the connection means to said periodically movable part to move the spring and said connection means to a position wherein energy is stored in the spring, readily releasable means for retaining said connection means in energy-storing position, and an abutment on the clutch control rod positioned in the path of travel of the connection means whereby when the connection means is released, it will impart a forceful blow to said abutment and thereby quickly shift the clutch control member into de-clutching position.

9. In a machine comprising a reciprocating work performing head driven from a constantly operating work source through a clutch having a clutch control member movable to clutching and de-clutching positions, a shuttle bar mounted for continuous movement in timed relation to the power source, and a control device for operatively connecting the clutch control member to the shuttle bar whereby the shuttle bar may shift the clutch control member into de-clutching position, an auxiliary clutch control mechanism mounted on the machine frame, said mechanism including a spring-actuated impact member, detent means for retaining the impact member in energy-storing condition, and means made operable by actuation of the control device to render said detent means ineffective to restrain movement of the impact member whereby the impact member is released, impacts and shifts the clutch control member into de-clutching position independently of the movement of the shuttle bar.

10. In a machine comprising a reciprocating work performing head driven from a constantly operating power source through a clutch having a clutch control member movable to clutching and de-clutching positions, a shuttle bar mounted for continuous movement in timed relation to the power source, a manual control for manually operating the clutch control member, and a solenoid-operated control element for operatively connecting the clutch control member to the shuttle bar whereby the shuttle bar may shift the clutch control member into de-clutching position, an auxiliary clutch control mechanism mounted on the machine frame, said mechanism including a spring-actuated impact member, detent means for retaining the impact member in energy-storing condition, means made operable by actuation of the solenoid-operated control element for rendering said detent means ineffective to restrain movement of the impact member whereby the impact member is released, impacts and shifts the clutch control member into de-clutching position independently of the movement of the shuttle bar, and means for retaining the impact member in energy-storing position when the manual control is operated to manually shift the clutch control member into de-clutching position.

11. In the machine comprising a reciprocating work performing head driven from a constantly revolving power source through a clutch having a clutch control member movable to clutching and de-clutching positions, a shuttle bar mounted for continuous oscillatory movement, and manually controlled means for operatively connecting the clutch control member to the shuttle bar for shifting the clutch control member into de-clutching position, and a mechanism under control of the operator for shifting the clutch control member into de-clutching position, said mechanism comprising a drive arm having a spring connected thereto, means for positioning said arm to store energy in the spring, detent means for retaining the arm in energy-storing position, an abutment element on the clutch control member positioned in the path of movement said arm when it is moved by said spring, and a solenoid-operated control device for rendering said detent means ineffective to restrain movement of said arm whereby the arm may be released to shift the clutch control member into de-clutching position independently of the movement of the shuttle bar.

12. In a machine comprising a work performing head driven from a constantly operating power source through a clutch having a clutch control member movable to clutching and de-clutching positions, a shuttle bar mounted for continuous oscillatory movement in timed relation to the power source, and a solenoid-operated control device for operatively connecting the clutch control member to the shuttle bar whereby the shuttle bar may shift the clutch control member into de-clutching position, an auxiliary clutch operating mechanism including a spring-actuated impact member, an abutment element on the clutch control member positioned in the path of movement of the impact member when it is actuated by said spring, a toggle for restraining said impact member in energy-storing position, when the toggle is in a straightened condition a control latch for actuating the toggle, a pivoted element connected to the solenoid operated control device and normally positioned to restrain the control latch out of engagement with the toggle arm, a setup arm having one end arranged to be engaged by the shuttle bar whereby the setup arm may be oscillated about its axis, means actuated by the control latch for coupling the setup arm to the impact member whereby the impact member is moved into energy-storing position by movement of the shuttle bar, and means whereby when the solenoid-operated control device is actuated to move said pivoted element out of engagement with the control latch, said control latch will engage and break the toggle arm whereby the impact member is released and shifts the clutch control member into de-clutching position independently of the movement of the shuttle bar.

13. In a machine comprising a reciprocating work performing head driven from a constantly revolving power source through a clutch having a clutch control member movable to clutching and de-clutching positions, a shuttle bar mounted for continuous oscillatory movement, and a solenoid-operated control element for operatively connecting the clutch control member to the shuttle bar for shifting the clutch control member into de-clutching position, an auxiliary clutch operating mechanism for automatically shifting the clutch control member into de-clutching position independently of the movement of the shuttle bar and at any time during movement of the reciprocating work performing head, said mechanism including a primary drive arm, a spring connected to one end of said arm, a secondary drive arm operatively connected to the primary drive arm and adapted to engage an abutment on the clutch control member to shift said member to de-clutching position, when the drive arms are released, a toggle arm having one end connected to the secondary drive arm and its opposite end to a fixed part of the machine frame and adapted to restrain the drive arms in energy-storing positions, when the toggle is in a straightened condition, a control latch for breaking the toggle arm, said solenoid-operated control element normally holding the control latch from breaking the toggle arm, and a control device electrically associated with the solenoid and whereby the solenoid may be actuated to operate said control element and release the control latch, whereby the toggle arm is broken and the drive arms released to shift the clutch control member into de-clutching position independently of the movement of the shuttle bar.

14. In a machine comprising a reciprocating work performing head driven from a constantly operating power source through a clutch having a clutch control member movable to clutching and de-clutching positions, a shuttle bar mounted for continuous oscillatory movement, and a solenoid-operated control element for operatively connecting the clutch control member to the shuttle bar for shifting the clutch control member into de-clutching position, an auxiliary clutch operating mechanism for instantaneously shifting the clutch control member into de-clutching position independently of the movement of the shuttle bar, said mechanism including a primary drive arm, a spring connected to one end of said arm and to the machine frame for moving the arm in one direction, a secondary drive arm operatively connected to the primary drive arm and adapted to engage an abutment on the clutch control member to shift said member to de-clutching position when the drive arms are released and moved by said spring, a toggle arm having one end connected to one of said drive arms and its opposite end to a fixed part of the machine frame and adapted to restrain the drive arms and spring in energy-storing positions, when the toggle is in a straightened condition, a control latch for breaking the toggle arm, said solenoid operated control element normally holding the control latch from breaking the toggle arm, a control device electrically associated with the solenoid and whereby the solenoid may be actuated to operate said control element and release the control latch whereby the toggle arm is broken and the drive arms released to shift the clutch control member into de-clutching position independently of the movement of the shuttle bar, and means for coupling one of said drive arms to the shuttle bar whereby the drive arms may be automatically reset to energy-storing position by movement of the shuttle bar.

15. In a machine comprising a reciprocating work performing head driven from a constantly revolving power source through a clutch having a clutch control member movable to clutching and de-clutching positions, a shuttle bar mounted for continuous oscillatory movement, a manual control, and a solenoid-operated control element for operatively connecting the clutch control member to the shuttle bar for shifting the clutch control member into de-clutching position, an auxiliary clutch operating mechanism for automatically shifting the clutch control member into de-clutching position independently of the movement of the shuttle bar, said mechanism including a primary drive arm, a heavy spring connected to one end of said arm and to the machine frame for moving the arm in one direction, a secondary drive arm operatively connected to the primary drive arm and adapted to engage an abutment on the clutch control member to shift said member to de-clutching position when the drive arms are released and moved by said spring, a toggle arm connected to one of said drive arms and to a fixed part of the machine frame and adapted to restrain the drive arms and spring in energy-storing positions, when the toggle is in a straightened condition, a control latch for breaking the toggle arm, said solenoid-operated control element normally holding the control latch from breaking the toggle arm, a control device electrically associated with the solenoid and whereby the solenoid may be actuated to operate said control element and release the control latch whereby the toggle arm is broken and the drive arms released to instantaneously shift the clutch control member into de-clutching position independently of the movement of the shuttle bar, means for coupling one of said drive arms to the shuttle bar whereby the drive arms may be automatically reset to energy-storing position by movement of the shuttle bar, and detent means controlled by movement of the clutch control member to lock the control latch against movement, whereby the clutch control member may be manually shifted into de-clutching position by said manual control without releasing said drive arm.

HARRY WILLIAM HOFFMAN.
STANLEY M. CUMMINGS.

REFERENCES CITED

The following references are of record in the file of this patent:

UNITED STATES PATENTS

| Number | Name | Date |
|---|---|---|
| 1,129,762 | Townsend | Feb. 23, 1915 |
| 1,194,379 | Gouldbourn et al. | Aug. 15, 1916 |
| 1,338,086 | Kendall | Apr. 27, 1920 |
| 1,383,525 | Carroll | July 5, 1921 |
| 1,580,923 | Selvig | Apr. 13, 1926 |
| 1,640,530 | Burton | Aug. 30, 1927 |
| 2,152,044 | Gross | Mar. 28, 1939 |
| 2,171,841 | Barney et al. | Sept. 5, 1939 |
| 2,260,416 | Wentworth et al. | Oct. 28, 1941 |
| 2,272,500 | Andres et al. | Feb. 10, 1942 |